United States Patent
Stekelenburg et al.

[11] Patent Number: 5,973,735
[45] Date of Patent: Oct. 26, 1999

[54] FLARE COMPENSATION

[75] Inventors: Michael A.W. Stekelenburg; Johannes H.J.M. Van Rooij, both of Breda, Netherlands

[73] Assignee: U.S. Philips Corporation, New York, N.Y.

[21] Appl. No.: 08/805,258

[22] Filed: Feb. 24, 1997

[30] Foreign Application Priority Data

Mar. 18, 1996 [EP] European Pat. Off. .............. 96200746

[51] Int. Cl.$^6$ ................................................ H04N 5/217
[52] U.S. Cl. .......................................... 348/241; 348/314
[58] Field of Search ................................... 348/241, 243, 348/250, 248, 235, 314

[56] References Cited

U.S. PATENT DOCUMENTS

| | | | |
|---|---|---|---|
| 4,974,810 | 12/1990 | Fiske | 348/688 |
| 5,155,586 | 10/1992 | Levy et al. | 348/104 |
| 5,280,354 | 1/1994 | Nakamura | 358/168 |
| 5,321,500 | 6/1994 | Capitant et al. | 348/97 |

*Primary Examiner*—Wendy Garber
*Assistant Examiner*—Andrew Martin
*Attorney, Agent, or Firm*—Michael E. Belk

[57] ABSTRACT

The flare compensation range of a camera is substantially increased by measuring and averaging a substrate or drain current representing an amount of charge elements generated in an image sensor, which is subsequently subtracted from the output signal of the image sensor.

4 Claims, 2 Drawing Sheets

C₃ R₃ = 50 μs
C₄ R₂ = 15 μs
C₃ = 10 C₄

FLARE COMPENSATION

FIELD OF THE INVENTION

The invention relates to the field of compensating flare, and to a camera comprising such an apparatus.

BACKGROUND OF THE INVENTION

U.S. Pat. No. 4,001,502 (Attorney's docket PHA 20,709) discloses a straylight or flare compensation circuit which corrects for excessive dark current and which features a blanking circuit to enable a stable black level without spikes and blanking noise. Flare arises from unwanted and spurious reflections from a field illuminated by incident light and spurious diffractions and minute inclusions causing reflection phenomena in fields illuminated by transmitted light. In addition, internal reflections can occur between the surfaces of the lenses forming the optical system of the imaging device and this can contribute to the overall flare in the final image produced on the target or sensing surface thereof. Due to the unwanted reflection or transmission, an opaque portion of a field illuminated by incident light, will not appear perfectly black in the final image but instead, will appear grey. It is assumed that flare is substantially evenly distributed over the entire field and therefore that all regions will appear lighter grey than they should. The video is integrated to provide a measure of the average picture level and is added to a reference level to compare with the blanking level in the original signal. The blanking circuit has a differential amplifier with diodes to ensure a correct and stable black level without noise or spikes.

These known methods work satisfactorily so long as the average picture value is a measure for the amount of light falling on the image sensor.

The above citations are hereby incorporated in whole by reference.

SUMMARY OF THE INVENTION

It is, inter alia, an object of the invention to provide an improved flare compensation. To this end, a first aspect of the invention provides a method as defined in claim 1. A second aspect of the invention provides an apparatus as defined in claim 2. A third aspect of the invention provides a camera as defined in claim 4. Advantageous embodiments are defined in the dependent claims.

The invention is based on the recognition that a compensation method which derives its compensation information from the video signal supplied by the sensor, no longer suffices if the video signal no longer gives useful information to the correction circuit, for example, when the amount of light shed on the image sensor exceeds the amount required for obtaining the maximum output signal of the image sensor or of the video processing circuitry. In practice, the amount of light shed on the image sensor may exceed the maximally required amount by a factor of 1000 or more. It thus appears that the charge packet in a CCD image sensor element is saturated very fastly. However, the light source continues to cause electron-hole pairs. In general, the superfluous electrons are drained to the N-substrate (vertical anti-blooming) or to an N+ drain. The holes are drained to a P+ drain or to the P-substrate. Consequently, it has been found that by measuring the P- or N-substrate current or the P- or N-drain current, a reliable measure is obtained for the amount of light shed on the image sensor. The amount of flare is linearly related to this current and can thus be easily corrected for by subtracting a compensation value obtained from this current from the sensor output signal. By using the substrate current of the image sensor, the flare compensation works in principle for all amounts of light, even those from very intense light sources.

As to the difference between the use of an N-substrate or drain current on the one hand, and the use of a P-substrate or drain current on the other, the following is noted. A P-substrate or drain collects holes, so that the measured correct represents the total amount of light shed on the sensor both when the sensor receives light within its normal range of operation and when the sensor receives more light than it can deal with. In contrast, an N-substrate or drain collects electrons, but only when and as far as the sensor receives more light than it can deal with. This means that to obtain a measure of the total amount of light when an N-substrate or drain is used, the output signal of the sensor should be added to the signal from the N-substrate or drain. For simplicity, this difference will not be discussed any further in this specification.

It is noted that GB-A-2,160,060 which is hereby incorporated in whole by reference discloses a process for controlling a sensitivity of a photosensitive charge transfer device and a device for performing this process, in which a plurality of anti-glare drains are inserted between the photosensitive elements, in such a way that each photosensitive element is adjacent to a drain; the process consisting of discharging by the anti-glare drains the charges generated by the light of an image, displacing the charges to the drains during a certain number of time intervals corresponding to the line blanking intervals of the video signal supplied by the output of the photosensitive device, which number is a function of the brightness of the complete image. More specifically, a servo-control device determines a discharge duration as a function of the values of the video signal obtained. In order to discharge charges to the anti-glare drains, which are maintained at a constant potential by the electrodes surmounting them, a pulsating voltage is simultaneously applied to the two transfer electrodes surmounting each photosensitive element of the device. A single pulse is not sufficient to discharge all the charges to the drain and for this reason a succession of pulses is provided making it possible to discharge the accumulated charge (decrementally). This succession of pulses is applied for the duration of a line blanking interval of the video signal, in order to ensure that stray couplings do not disturb the video signal. This known process differs from the present invention, in that in the present invention a measured drain or substrate current is used to correct an output signal of the sensor to compensate for flare, while in the prior art, the drains are only used to discharge charges when a pulsating voltage is applied to the transfer electrodes to control sensor sensitivity.

U.S. Pat. No. 4,302,777 (PHN 9,481) which is hereby incorporated in whole by reference discloses a flare compensation circuit for television, the flare compensation circuit comprising a signal integrator having an input for receiving a picture signal affected by flare or scattered light, and an output for supplying a compensation signal derived therefrom, and a difference amplifier having a first input for receiving the picture signal and a second input for receiving the compensation signal. The present invention differs from this known flare compensation circuit in that the compensation signal is derived from a substrate current, so that the compensation range in which flare compensation can be effected is not limited to the output signal range of the image sensor.

Those skilled in the art will understand the invention and additional objects and advantages of the invention by studying the description of preferred embodiments below with reference to the following drawings which illustrate the features of the appended claims:

DETAILED DESCRIPTION OF THE PREFERRED EMBODIMENTS

Figure 1:
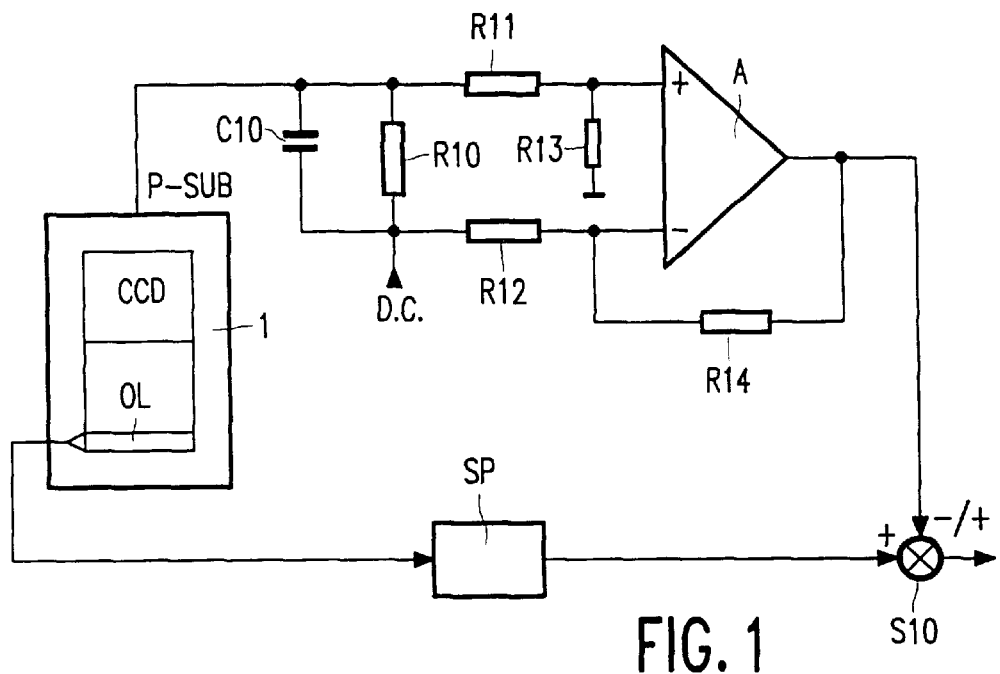
FIG. 1 shows a first embodiment of a camera comprising a flare reduction apparatus in accordance with the present invention.

In the embodiment of FIG. 1, an output signal from an output line OL of a CCD sensor 1 is applied to a signal processor SP. To compensate for flare, a substrate current P-sub is applied from the sensor 1 to a non-inverting input of an amplifier A thru a resistor R11. The substrate of the sensor 1 is connected to a DC voltage level input thru a capacitor C10 connected in parallel to a resistor R10. An inverting input of the amplifier A is connected to the DC voltage level input thru a resistor R13. A feedback resistor R14 is connected between an output and the inverting input of the amplifier A. The output signal of the amplifier A is connected to an inverting input of an output subtracter S10, the non-inverting input of which is coupled to an output of the signal processor SP. The output subtracter S10 supplies the output signal of the camera. The output subtracter S10 may be an adder if an electron current (from an N-substrate or drain) instead of a hole current (from a P-substrate or drain) is measured. In the embodiment of FIG. 1, the substrate or drain current P-sub is thus measured, averaged (C10) and subtracted (S10) from the image signal. The resistors R10 thru R14 are to be chosen in such a way that the flare compensation is adequate and independent of the said DC voltage level. If R11=R13 and R12=R14, than the flare compensation can be controlled by R10 independent of the said DC voltage level.

Figure 2:
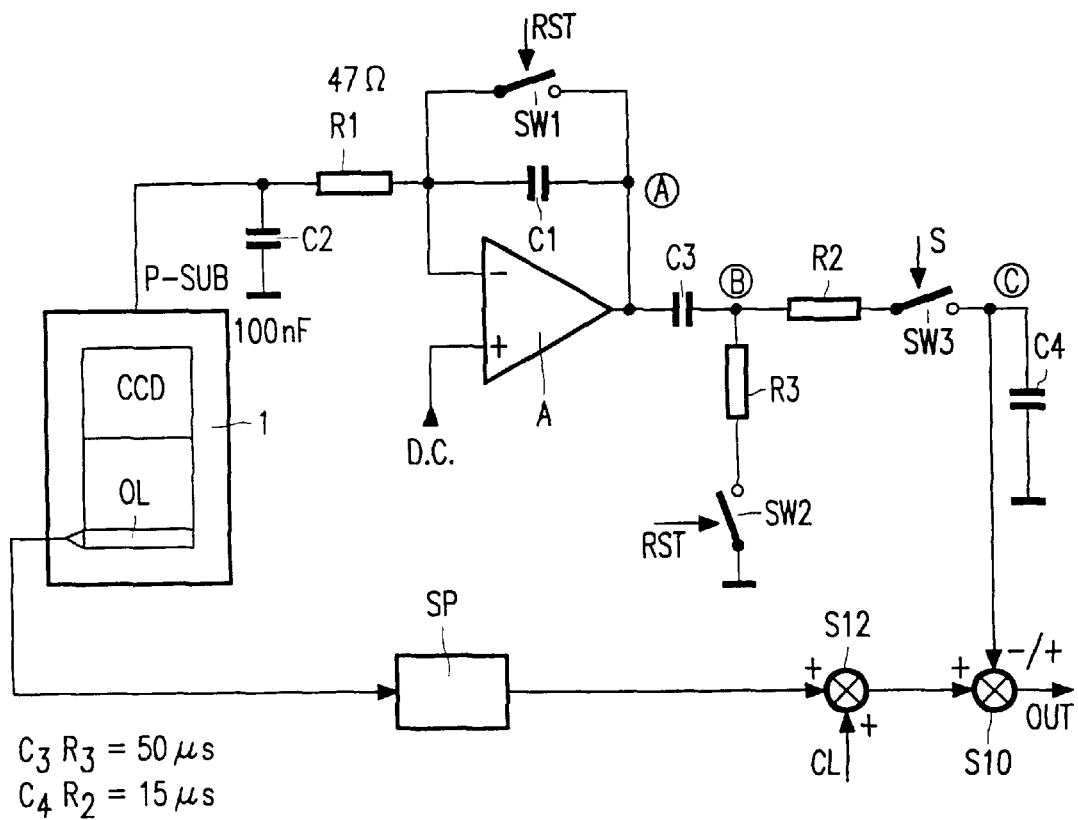
FIG. 2 shows a second embodiment of a camera comprising a flare reduction apparatus in accordance with the present invention.
Figure 3:
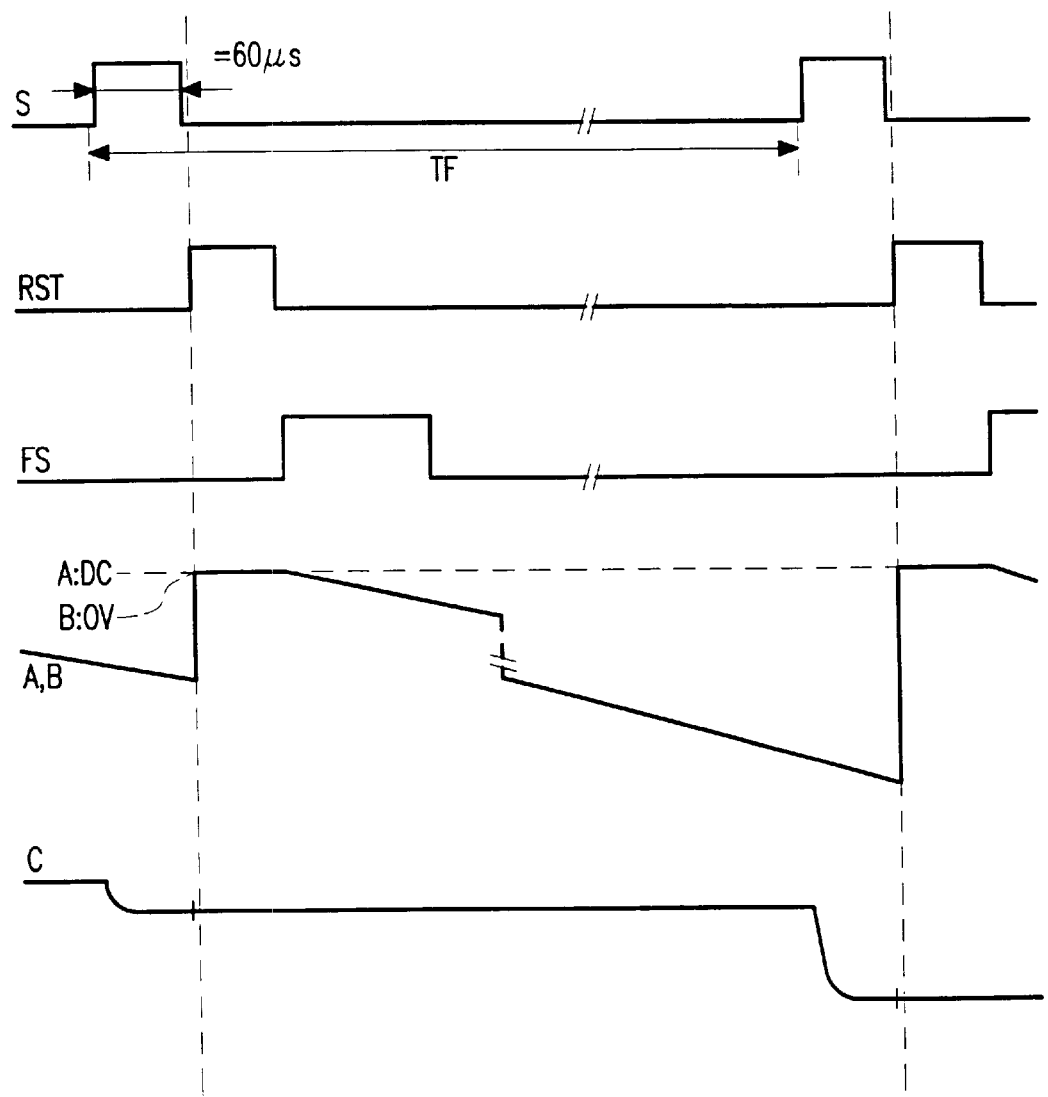
FIG. 3 shows some waveforms illustrating the operation of the embodiment of FIG. 2.

In the embodiment of FIG. 2, the output of the signal processor SP is connected to the non-inverting input of the output subtracter S10 thru an adder S12 to which a dark current compensation level CL is applied. The substrate current P-sub is applied to the inverting input of the amplifier A thru a resistor R1. A capacitor C2 connects the substrate current output of the sensor 1 to ground. The non-inverting input of the amplifier A is connected to the DC voltage level input, so that the inverting input of the amplifier A is a virtual earth point. A capacitor C1 connects the output of the amplifier A to its inverting input, thus forming an integrator circuit. A switch Sw1, controlled by a reset signal RST (see FIG. 3), is connected in parallel to the capacitor C1. The signal (A) at the output of the amplifier A is shown in FIG. 3. A capacitor C3 has one end connected to the output of the amplifier A, and another end coupled to ground thru a series connection of a resistor R3 and a switch Sw2 controlled by the reset signal RST. The signal (B) at the other end of the capacitor C3 is shown in FIG. 3. The signal (B) is applied to the inverting input of the output subtracter S10 thru a series connection of a resistor R2, and a switch Sw3 controlled by a sampling signal S (see FIG. 3). The signal (C) at the inverting input of the output subtracter S10 is shown in FIG. 3. The inverting input of the output subtracter S10 is connected to ground thru a capacitor C4.

The embodiment of FIG. 2 shows several advantages over the embodiment of FIG. 1, viz.:

In view of inaccuracies, the embodiment of FIG. 1 will be sensitive for the level of the DC voltage. This sensitivity is reduced significantly in the embodiment of FIG. 2.

The substrate or drain voltage remains constant, independent from the illumination. By means of capacitor C2 the control remains low-ohmic for frequencies where the operational amplifier does not work satisfactorily. The resistor R1 prevents stability problems caused by a too large capacitive load of the amplifier A.

The sensor's dark current is not taken into account in the flare compensation. (The sensor's dark current is measured by taking the difference between the so-called black reference line containing dark current charge, and an empty line containing no charge at all.) In practice, the dark current will be low in comparison to the current caused by incident light.

The integration result is sampled during each field. Thereafter the integrator is reset. As a result of these measures, the compensation signal will be a good measure for the flare in the field to be read from the sensor 1. Consequently, the compensation will remain to operate perfectly also for light sources which appear or disappear fastly in the image. The resistors R2, R3 ensure that the noise of the amplifier A is averaged, thereby preventing an unquiet dark level from occurring.

As mentioned in the description of FIG. 2, FIG. 3 shows some waveforms occurring in the embodiment of FIG. 2. Tf is the field period: 16.67 ms for 60 Hz TV systems, and 20 ms for 50 Hz TV systems. In an embodiment in which the image sensor 1 is a frame-transfer sensor, the sample pulse S and the reset pulse RST precede the frame shift pulse FS. However, the invention can also be applied to other sensors, like e.g. inter-line transfer sensors. Also with such sensors, the sample pulse S and the reset pulse RST are in the vertical blanking interval. If the camera has an illumination control in which the image sensor is reset during the field period (integration period), the flare compensation device should also be reset by adding an additional reset pulse substantially coinciding with the sensor reset. Alternatively, the compensation signal at point (C) in FIG. 2 is decreased by a factor corresponding to the factor by which the effective integration period of the sensor is decreased as a result of the additional reset during the integration period, before being combined by subtracter S10 with the output signal of the sensor.

A preferred embodiment of the invention can be summarized as follows. In a camera, the contrast ratio is deteriorated by reflections in e.g. the lens, resulting in flare. The flare compensation range is substantially increased by measuring and averaging a substrate current P-sub representing an amount of charge elements generated in an image sensor 1, which is subsequently subtracted (S10) from the output signal of the image sensor.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The invention can be implemented by means of hardware comprising several distinct elements, and by means of a suitably programmed computer. While an analog implementation is shown in FIGS. 1 and 2, a digital alternative is possible as well; it is well-known to substitute a digital counting operation for an analog integration (averaging) by means of a capacitor.

What is claimed is:

1. A method of compensating flare, comprising the steps of:

receiving a substrate or drain current representing an amount of charge elements generated in an image sensor;

obtaining a compensation signal from the substrate or drain current; and combining a sensor output signal and the compensation signal to obtain a corrected output signal.

2. Apparatus for compensating flare, comprising:

means for receiving a substrate or drain current representing an amount of charge elements generated in an image sensor;

means for obtaining a compensation signal from the substrate or drain current; and means for combining a sensor output signal and the compensation signal to obtain a corrected output signal.

3. The apparatus of claim 2, wherein said compensation signal obtaining means include means for integrating the substrate or drain current.

4. A camera, comprising:

an image sensor;

means for receiving a substrate or drain current representing an amount of charge elements generated in an image sensor;

means for obtaining a compensation signal from the substrate or drain current; and means for combining a sensor output signal and the compensation signal to obtain a corrected output signal.

* * * * *